Figure 9:
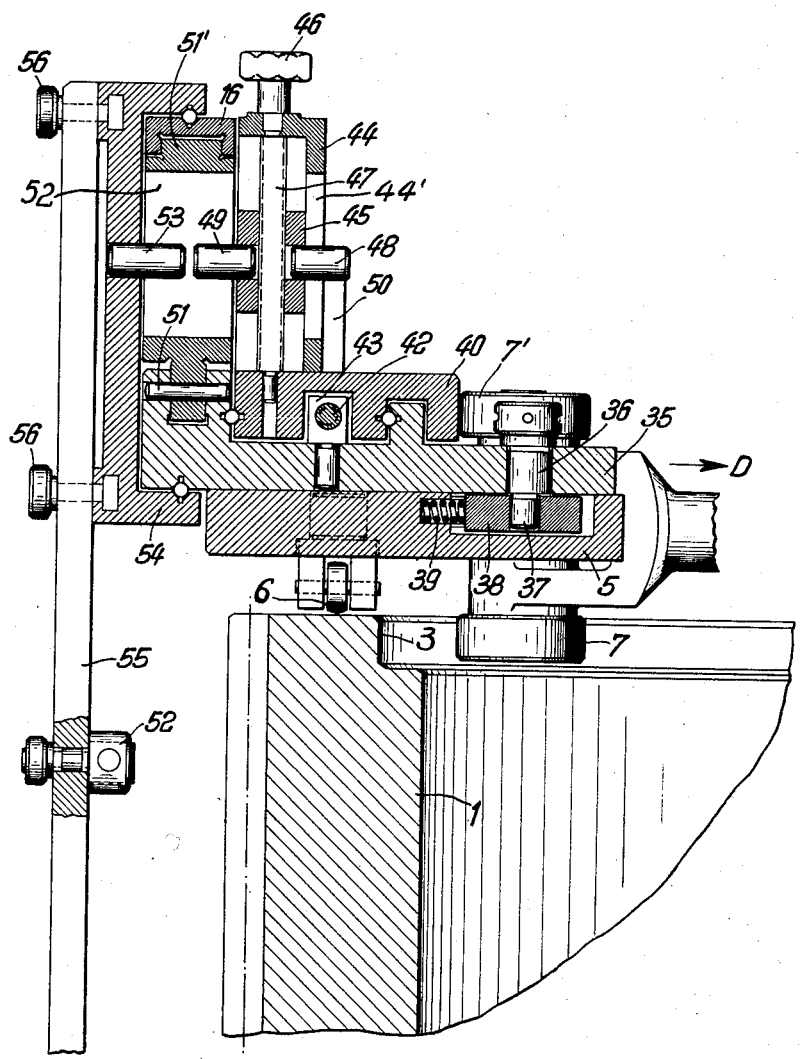

Oct. 27, 1959     E. WAGNER     2,909,844
GEAR TESTER
Filed Dec. 19, 1955     4 Sheets-Sheet 1
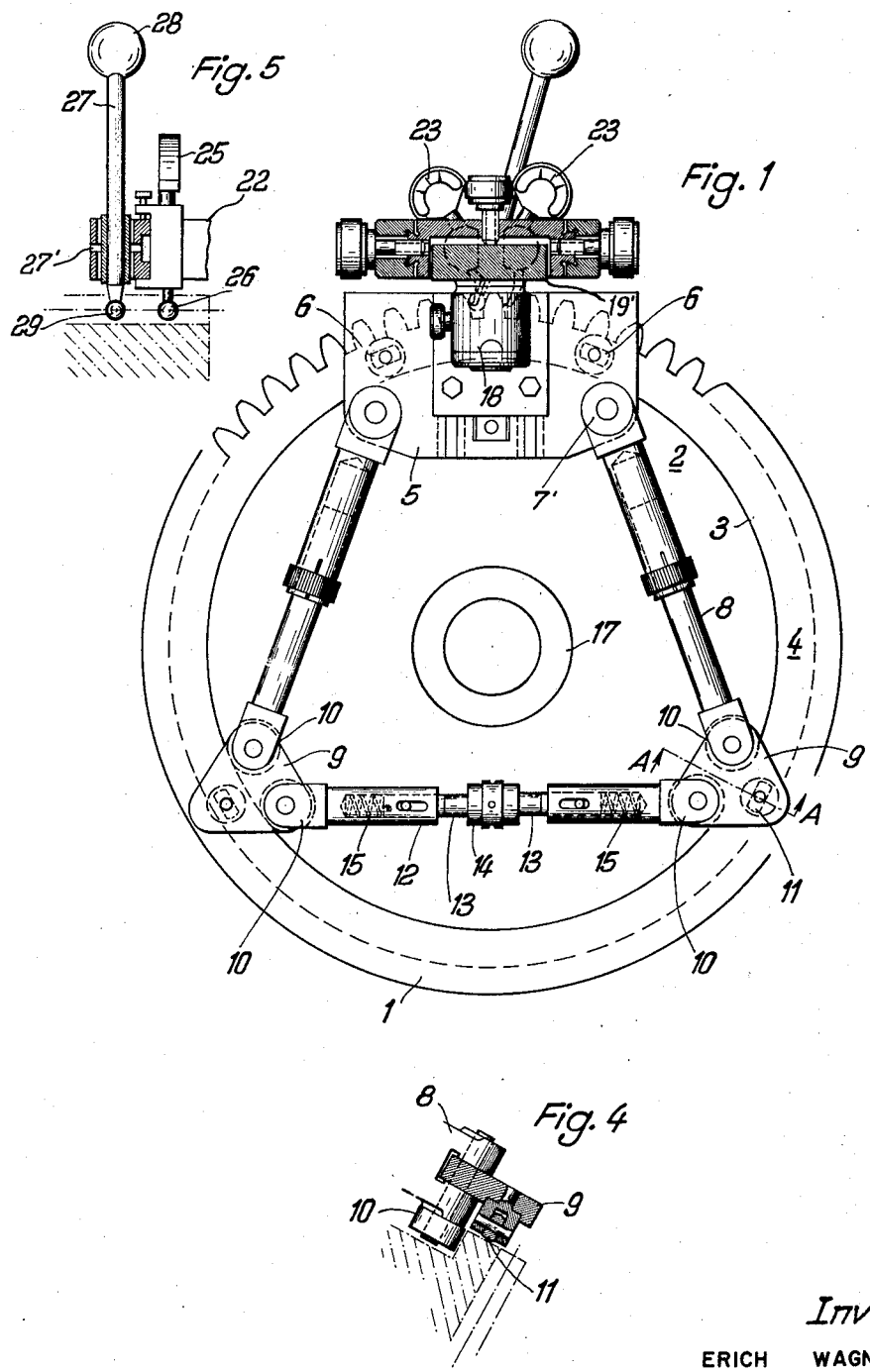
Inventor:
ERICH WAGNER
Mead, Browne, Schuyler
& Beveridge
ATTORNEYS

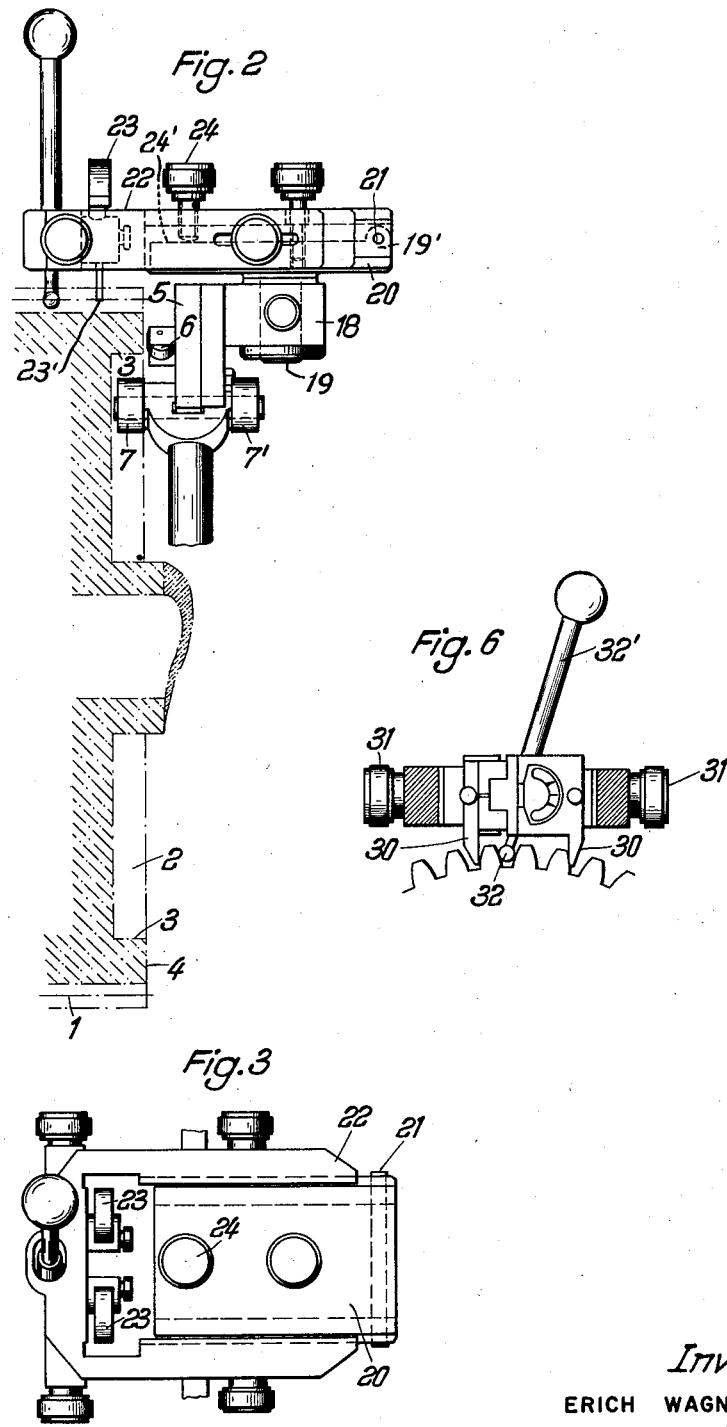

Oct. 27, 1959    E. WAGNER    2,909,844
GEAR TESTER
Filed Dec. 19, 1955    4 Sheets-Sheet 3
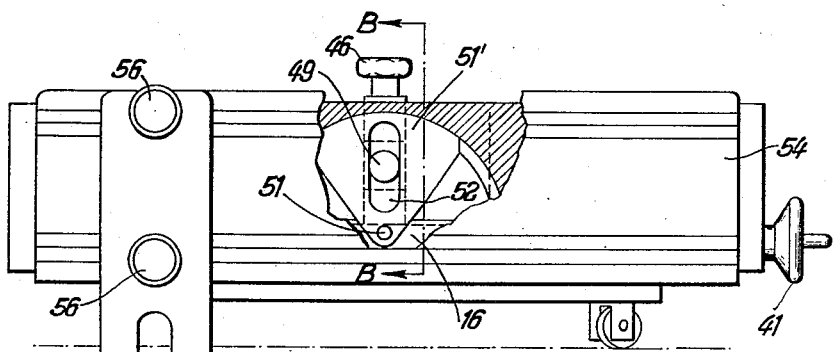
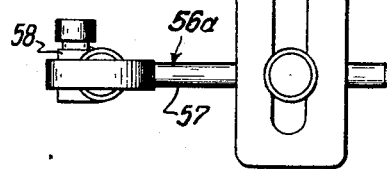
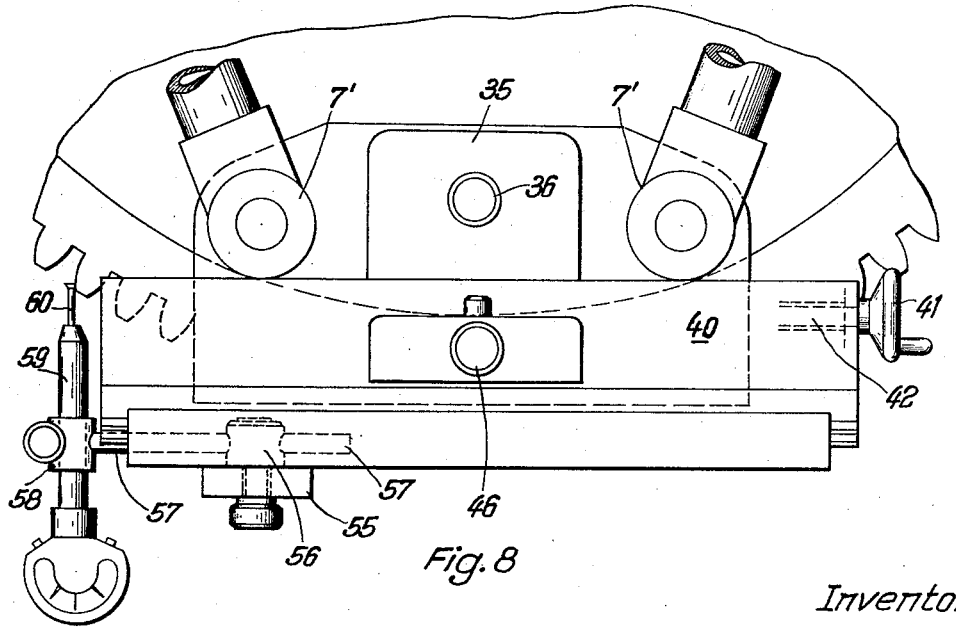
Inventor:
ERICH WAGNER
Mead, Browne, Schuyler
& Beveridge
ATTORNEYS Inventor:
ERICH WAGNER United States Patent Office 2,909,844
Patented Oct. 27, 1959

2,909,844
GEAR TESTER

Erich Wagner, Huckeswagen, Rhineland, Germany, assignor to W. Ferd. Klingelnberg Sohne, Remschied-Berghausen, Germany, a corporation of Germany Application December 19, 1955, Serial No. 554,020

Claims priority, application Germany December 20, 1954

6 Claims. (Cl. 33—179.5)

This invention relates to gear testing apparatus, and more particularly to a gear testing apparatus adapted to test large gears.

The shape and size of certain gears frequently make it difficult to use stationary gear testers. Inspection is then usually performed with the aid of hand testers which are hardly adequate since, on the one hand, the inspection performed is not complete as the tooth profile cannot be checked while, on the other hand, the test cannot be related to the gear axis. Relation of the test to the gear axis is of vital importance in the quality control of gears.

Accordingly, it is an object of this invention to provide a gear testing apparatus, particularly adapted for testing large gears, which permits the test to be related to the gear axis.

It is another object of this invention to provide a gear testing apparatus, suitable for testing large gears, which is compact in size.

It is still another object of this invention to provide a gear testing apparatus including improved attachments for making involute and helix measurements on gears.

The invention described hereinafter is designed to eliminate the difficulties previously mentioned. The testing apparatus of the invention is equipped with tracer elements enabling it to move over the face of the gear rim, as well as with additional tracer elements enabling movement along a reference face concentric with the gear axis, thereby relating the test to the gear axis. Both elements take the form of rollers.

If large gears are to be tested, the testing apparatus need not be as large as the stationary testing equipment which is used. The compact construction of the gear testing apparatus of the invention is not governed by the size of the gears to be tested but yet offers the advantage inherent in stationary testers with respect to the possibility of relating the tests to the gear axis. The test device can be placed on the rim of a large gear and moved around the gear axis along a concentric plane both from one tooth to the next when checking the pitch, and by a rolling motion derived from the base circle and the concentric reference face, as during the involute test.

If the concentric faces on the gear being tested, such as the cylindrical circumference of the gear axis, are not suitable as reference faces for the testing apparatus, the gear can be readily provided with a reference face especially machined for the test. The gear rim can, for example, be given a small circumferential recess. The time required for this operation, even when allowing for the fact that it has to be repeated on each gear, represents a fraction of the time saving which can be effected by changing over to the small testing machine of the invention. If the reference face is provided on the gear rim, it faces the axis of the gear. The tracing elements of the tester then move inside the gear. There are several possibilities to insure reliable contact between the tracing elements and the reference face. A useful solution is the use of supports provided on the tester which create additional tracing points on the reference face. A spring mechanism can hold the tracing points firmly against the reference face and at the same time through a transmission of forces via the supports also exert pressure on the tracing elements.

It is advisable to split up the tester into a carrier for the tracing elements and attach interchangeable accessories for different tests. During the involute tests, the speed of the tester on the reference face, having an arbitrary diameter governed by the design, is converted by reduction gearing for a dial indicator tip moved at a tangent to the involute base circle. The speed is thereby transformed to that speed which the path of the tip is required to have if intended to coincide with the path of the base circle. The angular velocity of the base circle conforms to the angular velocity of the tip moving along the reference face.

Further details and advantages of the invention will become apparent from the following description taken in conjunction with the accompany drawings in which:

Fig. 1 is a top plan view of a new testing apparatus;
Fig. 2 is a side elevation view of the apparatus of Fig. 1;
Fig. 3 is a plan view of the apparatus shown in Fig. 2;
Fig. 4 is a view in section along line A—A of Fig. 1;
Fig. 5 is a side elevation view of an attachment used for the true-running or concentricity test;
Fig. 6 is a plan view of an attachment for the tooth width test;
Fig. 7 is a side elevation view of an attachment for the tooth profile test;
Fig. 8 is a top plan view of the attachment of Fig 7; and
Fig. 9 is a view along section line B—B of Fig. 7.

The gear to be tested is generally indicated at 1 in Fig. 1 and includes a recess 2 having a turned or ground axially and circumferentially extending reference face 3 concentric with the gear axis. Reference face 3 is intended solely for purposes of the test operations and will be hereinafter referred to as the test face. The gear includes a rim 4 having a carefully machined face. The testing apparatus includes a base plate 5 which is supported by rollers 6 for rolling movement along the face of gear rim 4. Base plate 5 is adapted to roll along test face 3 by rollers 7 (see Fig. 2) which are supported for rolling contact with test face 3 by base plate 5. Support arms 8 include yoke-like portions which are pivotally connected to opposite sides of base plate 5 and which support rollers 7. The opposite ends of each of the support arms 8 is pivotally connected to one of the oppositely disposed triangular joint plates 9. The end of each support arm 8 connected to plate 9 supports a roller 10 similar to rollers 7, which engages the surface of test face 3. The plates 9 also carry rollers 11 which run along the face of the gear rim 4 in the same manner as the rollers 6 carried by plate 5.

The triangular plates 9 each have pivotally connected to one of their corners and extending toward the other plate a link member 12 containing a hollow bore portion. Each of the link members 12 accommodates a mandrel 13, one of the mandrels having a right-hand thread while the other has a left-hand thread. The two mandrels 13 are joined together by a setting nut 14 which likewise has a left-hand and a right-hand thread engaging the respective mandrels. By turning the setting nut 14, linear motion may be imparted to the two mandrels 13 to increase their over-all length, thereby causing the mandrels to actuate spiral springs 15 received in the hollow bores of the respective link members 12. By this means, the pressure of rollers 10 on test face 3 may be adjusted. The pressure on rollers 10 and on plates 9 is also transmitted through support arms 8 to the rollers 7 carried by plate 5.

The base plate 5 carries a holder 18 upon which are mounted the attachments for the various tests. Figs. 1 to 3 show the attachment for the pitch test. The holder 18 is radially adjustable on base plate 5 and carries a pivotal supporting post 19 which, in turn, carries a block member 19'. A hinge-like flap member 20 is supported by block member 19' for pivotal movement about an axis 21. Member 20 includes a portion 22 which is slidably movable with respect to the main body of flap 20 in a direction perpendicular to axis 21. Member 22 carries a pair of spaced sensitive gauges or dial indicators 23. The tips 23' of the gauges or dial indicators are applied to two adjacent tooth flanks in the well-known manner to establish the variation in the pitch by proceeding from one flank to the next. Uniform depth positioning is assured by a screw 24 which abuts a fixed rear portion 24', the latter being mounted on flap member 20.

As shown in Fig. 5, the accessory device shown in Figs. 1, 2 and 3 can be used in a slightly modified manner to check for true-running or concentricity of the gear. The two dial indicators 23 used in Figs. 1 to 3 are replaced by a single dial indicator 25 having a spherical tip 26. The lower end of the slidable portion 22 carries a mandrel 27 having a ball handle 28, the mandrel carrying at its radially inner end a spherical tip 29. The mandrel 27 is supported for pivotal movement about axis 27' which extends axially of the gear. The mandrel is used for raising flap 20 and also for sensitively advancing the attachment from one tooth to the next. To accomplish this, the ball end 29 of the mandrel is introduced into a tooth space. Swivelling of mandrel 27 about axis 27' effects a slight swivel motion of the attachment until the desired measuring position is reached.

The attachment shown in Fig. 6 is for the well-known tooth width test. The attachment of Fig. 6 includes two parallel knife edges 30. The distance between the knife edges is adjusted by setting screws 31. A ball 32 is adapted to contact tooth flanks as shown in Fig. 6 to limit the radial depth setting of the device and is indexed by the lever 32'. The attachment shown in Fig. 6 can be mounted on the attachment of Figs. 2 and 3.

The attachment for the involute test is shown in Figs. 7 to 9. This attachment includes a main supporting block 35 (Fig. 9) which is guided on the base plate 5. Base plate 5 carries a slide 38 which is engaged by the end 37 of an eccentric member 36 carried by the main supporting block 35. Slide 38 is biased by a spring 39. By manually turning the eccentric pivot 36, the main supporting block 35 may be radially moved in the direction D.

Main supporting block 35 supports a rolling slide 40 for sliding movement, and the radial movement of main supporting block 35 provided by rotation of eccentric pivot 36 in the manner just described serves to engage the edge of rolling slide 40 with rollers 7' which are connected to and rotate with the rollers 7 previously described. Slide 40 can be moved along main supporting block 35 by hand wheel 41 which controls movement of a screw 42 in a nut 43 associated with the main supporting block 35.

Slide 40 carries a vertical guide 44 in which a slide member 45 is vertically moved by a knob 46 which controls a screw-threaded spindle 47.

Two pins 48 and 49 are carried by the vertical slide 45 and project outwardly with respect to the slide as shown in Fig. 9. Pin 48 projects through a slot-shaped opening 44' in vertical guide 44. The height of the slide 45 can be adjusted by placing a slip gauge 50 beneath pin 48 and the upper face of rolling slide 40. Pin 49 on the opposite side of slide 45 is received within a guide slot 52 formed in a lever segment 51' which is pivotally supported upon main supporting block 35 by a pivot pin 51. As best seen in Fig. 7, guide slot 52 extends radially with respect to the pivotal mounting of lever segment 51'.

A slide member 54 is slidably movable along the radially outer edge of main supporting block 35 and carries a pin 53 which also is received within guide slot 52 in lever segment 51'. Referring to Figs. 7 and 9, it will be noted that lever member 51' has a sector shape (see Fig. 7 in particular). The arcuate upper edge of the lever member engages a complementary surface on portion 16 of main supporting block 35 whereby member 51' is guided as it pivots about pivot pin 51. Thus, when pin 49 is moved horizontally (according to Fig. 7), lever member 51' is caused to pivot about pivot pin 51 and thus moves pin 53 horizontally. Movement of pin 53 causes slide 54 to move to either the right or left as shown in Fig. 7, depending upon the movement imparted to pin 53. Vertical guide 44 is carried with slide 40 and hence movement of slide 40 from right to left or vice versa in Fig. 7 causes a corresponding movement of pin 49. The horizontal movement of pin 49 is transmitted by the wall of slot 52 to cause lever segment 51' to pivot about its pin 51 and hence drive pin 53 to, in turn, drive outer slide 54 in the same horizontal direction that slide 40 is driven. When the respective pins 49 and 53 are at equal distances from the pivotal axis defined by pin 51, a given movement of slide 40 results in an equal movement of slide 54. However, should pin 49 be elevated from the position shown in Fig. 9, by adjustment of screw 47, the horizontal movement of slide 54 for a given movement of slide 40 would be reduced by the ratio of the distance from pivot pin 51 to slide 53 divided by the distance from pivot pin 51 to pin 49. In this respect the walls of slot 52 act as a lever, and by adjusting the vertical position of pin 49 relative to pivot pin 51, the total input movement represented by the movement of slide 40 may be either magnified or reduced in its transmission to slide 54. Since the distance between pivot pin 51 and the plane of movement of pin 53 is fixed, any desired ratio may be achieved by locating pin 49 at a given height as by means of a measuring block 50.

Slide 54 carries an adjustable arm 55 which is clamped to slide 54 by screws 56. A slot in arm 55 accommodates a holder generally indicated at 56a which can be set and locked according to the width of the gear to be tested. A holder 56a has a rod 57 with a sleeve-like end portion 58 which receives the adjustable dial indicator 59. The contact pressure of dial indicator 59 against the tooth is directed at right-angles to the axis of the dial indicator tip 60.

The involute test is performed by moving rolling slide 40 along main supporting block 35 by means of hand wheel 41. This causes rollers 7', which are held against the edge of rolling slide 40, to rotate because of the frictional engagement between rollers 7' and the edge of rolling slide 40. Rollers 7 are mounted on a common axis with rollers 7' and rotate with rollers 7'. Since rollers 7 roll along the test face 3 which is concentric with the gear, the gauging unit moves around the axis of the gear at a uniform center distance. Therefore, the rolling slide 40 performs a tangential motion with a velocity which corresponds to the peripheral velocity of the gauging unit at the radius of the reference face 3 arranged concentrically on the gear being tested. The slide 54 which carries the gauging unit has a speed governed by the prior vertical setting of vertical slide 45 and corresponding to that of the theoretical base circle of the involute to be measured. Slide 54 has a movement relative to slide 40 which depends upon the relative positions of pins 53 and 49 in lever segment 51', the position of ipn 49 depending upon the slip gauge 50. The face of the tracer tip 60, which is set at a tangent to the nominal base circle, describes a correct involute of this circle, and the contact pressure is applied in the normal direction of the tooth flanks.

As will be apparent to those skilled in the art, the apparatus shown in Figs. 7–9 may be used to test the helix angle of a helical gear by causing the dial indicator tip 60 to move in a helical path resulting from properly correlating movement of the indicator tip in a direction parallel to the gear axis with movement of the indicator tip resulting from movement of the testing unit with respect to reference face 3.

The invention is not restricted to the example described. for example, the reference face produced directly on the gear to be tested could also be on a separate part; e.g., a plate, and detachable from the gear. A full circular disc can in certain cases be dispensed with and segments used instead. Additional attachments could also be provided for the rolling test.

While there have been described particular embodiments of the invention, it will be obvious to those skilled in the art that various changes and modifications may be made therein without departing from the invention and, therefore, it is aimed to cover all such changes and modifications as fall within the true spirit and scope of the invention.

What is claimed as the invention is:

1. For use in performing an involute test on the teeth of a gear having a reference face concentric with the axis of the gear; a gear testing unit comprising three arm members pivotally interconnected with each other to define a substantially planar triangular frame, a roller member rotatably supported in said frame adjacent each corner of said frame, said roller members being located in a substantially common plane offset from and generally parallel to the plane of said frame, means on one of said arms for adjusting the length of said arm to locate all of said roller members in rolling contact with the reference face of a gear to be tested, a supporting plate mounted upon said frame adjacent one corner thereof, a slide member mounted upon said supporting plate for reciprocating movement, means movable in response to reciprocating movement of said slide member to rotate the roller member mounted upon said frame adjacent the frame corner at which said supporting plate is located to drive said frame and said supporting plate in rotary movement about the axis of the gear, and involute test means mounted upon said supporting plate for movement in response to movement of said slide member.

2. For use in performing tests on the teeth of a gear having a cylindrical reference surface coaxial with the axis of said gear and an annular reference surface lying in a plane perpendicular to said axis; a gear testing unit comprising a polygonal frame lying generally in a first plane, a plurality of rollers mounted on said frame adjacent each corner of said frame for rotation about parallel axes perpendicular to said first plane, antifriction means on said frame for supporting said frame upon the annular surface of a gear to be tested with said first plane extending parallel to the plane of said annular reference surface, means for adjusting said frame to locate all of said rollers in rolling contact with the cylindrical reference surface of a gear upon which said frame is supported by said antifriction means, a gear testing device mounted upon said frame and including an indicator tip mounted for movement along a fixed path relative to said frame, drive means operable to drive said indicator tip in movement along said path, and means coupling said drive means to one of said rollers for rotating said one of said rollers about its axis through an angle proportional to the distance said indicator tip is moved along said path by operation of said drive means.

3. A gear testing unit as defined in claim 2 wherein said coupling means includes means for varying the proportionality between the angular movement of said one of said rollers and the distance of movement of said indicator tip along said path.

4. A gear testing unit as defined in claim 2 wherein said means for adjusting said frame includes resilient means for biasing said rollers against said cylindrical reference surface.

5. A gear testing unit as defined in claim 2 wherein said drive means comprises a slide member mounted for reciprocating movement upon said frame, a lever mounted in said frame for pivotal movement about an axis perpendicular to the direction of reciprocating movement of said slide member, a first pin coupling said lever to said indicator tip to drive said tip in movement along said path upon pivotal movement of said lever about said axis, a second pin coupling said slide member to said lever to drive said lever in pivotal movement about said axis upon reciprocating movement of said slide member, and means for adjusting said second pin radially of the axis of said lever.

6. A gear testing unit as defined in claim 4 wherein said means coupling said drive means to one of said rollers comprises a second roller mounted in said frame for rotation about an axis coaxial with said one of said rollers, said second roller being located in said frame in rolling contact with said slide member whereby reciprocatory movement of slide member causes said second roller to be rotated, and means for transmitting rotary movement of said second roller to said one of said rollers.

References Cited in the file of this patent

UNITED STATES PATENTS

| | | |
|---|---|---|
| 1,304,592 | Olson | May 27, 1919 |
| 1,326,696 | Simmons | Dec. 30, 1919 |
| 1,924,405 | Hughes | Aug. 29, 1933 |
| 2,407,490 | Gregg | Sept. 10, 1946 |
| 2,408,689 | Seme | Oct. 1, 1946 |
| 2,564,376 | Schwartz | Aug. 14, 1951 |
| 2,601,447 | Neff | June 24, 1952 |
| 2,697,283 | Leuthold | Dec. 21, 1954 |
| 2,766,532 | Eisele | Oct. 16, 1956 |